United States Patent [19]

Sugoh et al.

[11] Patent Number: 4,861,572

[45] Date of Patent: Aug. 29, 1989

[54] PROCESS FOR MANUFACTURE OF METAL OXIDE

[75] Inventors: Yoshihisa Sugoh, Hino; Yasuo Ochi, Yokohama, both of Japan

[73] Assignee: Kabushiki Kaisya Advance, Tokyo, Japan

[21] Appl. No.: 137,736

[22] Filed: Dec. 24, 1987

[30] Foreign Application Priority Data

Dec. 27, 1986 [JP] Japan .................................. 61-309017

[51] Int. Cl.[4] .............................................. C04B 35/00
[52] U.S. Cl. ................................. 423/339; 423/335;
423/592; 423/604; 423/608; 423/610; 423/618;
423/619; 423/622; 423/624; 423/625; 423/635;
423/636; 423/641
[58] Field of Search ............... 423/335, 339, 592, 604,
423/608, 610, 618, 619, 622, 624, 625, 635, 636,
641

[56] References Cited

U.S. PATENT DOCUMENTS

| | | | |
|---|---|---|---|
| 4,177,251 | 12/1979 | Bendig et al. | 423/628 |
| 4,357,427 | 11/1982 | Ho et al. | 501/152 |
| 4,543,341 | 9/1985 | Barringer et al. | |
| 4,619,908 | 10/1986 | Cheng et al. | 423/338 |
| 4,732,750 | 3/1988 | Olson et al. | 423/610 |

FOREIGN PATENT DOCUMENTS 2168334A 6/1986 United Kingdom .

OTHER PUBLICATIONS

"Metal Alkoxides for Sol-Gel Applications" by Jim Johnston, Dynamit Nobel Chemicals, received by Patent and Trademark Office on Nov. 6, 1987.
Chemical Abstracts 104:134796p.
Chemical Abstracts, vol. 105, No. 22, Dec. 1986, p. 163, Abstract No. 193842u, Columbus, Ohio, U.S.A. and JP-A-61 141 604 (Tokuyama Soda Co. Ltd.) 6-2-8-1986.
Report of the National Institute for Research in Inorganic Materials, Science and Technology Agency, T. Shimohira, No. 14, pp. 49-58, 1977.

Primary Examiner—John Doll
Assistant Examiner—Wayne A. Langel
Attorney, Agent, or Firm—Finnegan, Henderson, Farabow, Garrett & Dunner

[57] ABSTRACT

An improved process for the manufacture of a metal oxide is disclosed. In the process wherein a hydrolyzable organometallic compound is hydrolyzed by an alkaline hydrolyzing agent in an alkaline organic solvent, and thereafter, the metal oxide is formed by a condensation reaction of a metal hydroxide resulting from the hydrolysis of the organometallic compound, the improvement comprises feeding the organometallic compound and the hydrolyzing agent into the organic solvent so that a concentration of the hydrolyzed compound is initially above a critical level of supersaturation, and thereafter, is maintained in a range from above an upper limit of solubility to the critical level of supersaturation. According to the above process, the metal oxide can be obtained in the form of a powder material with a uniform particle size distribution.

10 Claims, 8 Drawing Sheets

PROCESS FOR MANUFACTURE OF METAL OXIDE

BACKGROUND OF THE INVENTION

1. Field of the Invention

The present invention relates to an improved process for the manufacture of a metal oxide.

2. Description of the Related Art

When a fine powder of inorganic oxide is produced by an industrial process, a bulk of the inorganic oxide is ground to fine powders more than several microns ($\mu$m) in size, and it is difficult to obtain a finer powder by a known grinding process.

Recently, it has become possible to obtain an ultrafine powder material of several hundreds of angstrom (Å) in size by a vapor-phase reaction. However, it is difficult to apply such a method for a production of a bigger powder. There is a demand for a process for manufacturing a powder material with a uniform particle size, i.e., a narrow distribution of a particle size which ranges from 0.1 $\mu$m to several microns.

Several attempts have been made to meet such a demand. For example, Takajiro Shimohira mentioned in the Report of the National Institute for Research in Inorganic Materials, Science and Technology Agency, No. 14, pages 49–58, 1977, that, to produce $SiO_2$ powder, a certain amount of ethyl silicate and a certain amount of an aqueous ammonia are reacted batchwise to grow the powder to about 0.3 $\mu$m while realizing a narrow distribution of the uniform particle size.

In the above method, however, a concentration of alkoxide must be raised to increase the particle size, and this raising of the concentration can affect the uniformity of the size distribution. Therefore, a range of the concentration which is practically operable is extremely limited.

To solve this problem, an attempt was made wherein fine powder materials produced by the above process and having a narrow distribution of the particle size were introduced into a fresh reaction system, with the intention of growing the powder in a batchwise reaction by using the fine powder materials as a core. However, the growth of the powder materials was accompanied by a formation of fresh grains, and thus the size distribution was adversely affected.

In addition to $SiO_2$ powder, there were attempts to produce an inorganic oxide powder with a narrow distribution of size by a batchwise reaction, but a successful method of controlling the size distribution has not been found. As stated above, it is difficult to obtain a powder material having a narrow distribution of size ranging from 0.1 $\mu$m to several microns, by a batchwise reaction.

SUMMARY OF THE INVENTION

Accordingly, an object of the present invention is to provide a practical process for stably manufacturing a fine powder oxide with the narrow distribution of any size, by feeding an organometallic compound and a hydrolyzing agent into a reaction medium at a given rate to control the reaction rates of the hydrolysis and condensation reaction.

Other objects and advantages of the present invention will be apparent from the following description.

In accordance with the present invention, there is provided a process for the manufacture of a metal oxide wherein a hydrolyzable organometallic compound is hydrolyzed by an alkaline hydrolyzing agent in an organic solvent, and thereafter, the metal oxide is formed by a condensation reaction of a metal hydroxide resulting from the hydrolysis of the organometallic compound. This process is characterized in that the organometallic compound and the hydrolyzing agent are fed into the organic solvent so that a concentration of the hydrolyzed compound is initially above a critical level of supersaturation, and thereafter, is maintained in a range from above an upper limit of solubility up to the critical level of supersaturation.

Further, the present invention provides the metal oxide prepared by the above process.

DESCRIPTION OF THE PREFERRED EMBODIMENTS

Figure 1:
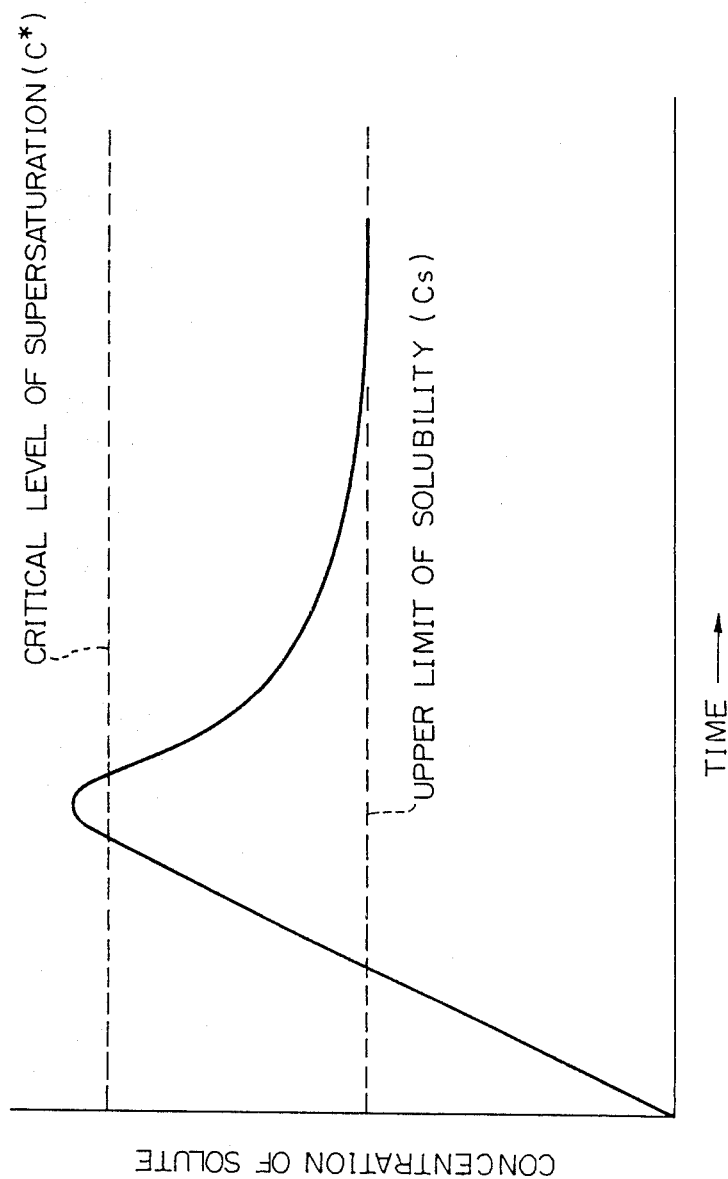
FIG. 1 is a graph illustrating a principle of the process of the present invention.

In the process of the present invention, any known organometallic compound may be employed so long as it is hydrolyzable. Preferably the compound used has a structure such that a metallic element present in the compound is bonded to an organic moiety therein via an oxygen atom.

In a preferred embodiment of the present invention, the metallic element is selected from a group consisting of the elements belonging to Groups I to IV of the Periodic Table. More particularly, the metallic element is, for example, lithium (Li), sodium (Na), magnesium (Mg), aluminium (Al), silicon (Si), potassium (K), calcium (Ca), scandium (Sc), titanium (Ti), copper (Cu), zinc (Zn), gallium (Ga), germanium (Ge), rubidium (Rb), strontium (Sr), yttrium (Y), zirconium (Zr), indium (In), tin (Sn), cesium (Cs), barium (Ba), lanthanoid (Ln), hafnium (Hf), mercury (Hg), thallium (Tl), and lead (Pb).

The more preferable metallic element is Li, K, Na, Mg, Ca, Sr, Al, Y, Ga, Sc, La, In, Ti, Zr, Si, Sn, or Ge.

The organic moiety present in the organometallic compound is, for example, alkyl or alkenyl having 1 to 10 carbon atoms, preferably 1 to 6 carbon atoms.

The typical organometallic compound which can be used in the present invention is a metal alkoxide compound of the formula $$M(OR)_x$$

wherein M represents the metallic element as defined above, R represents a hydrocarbon group, preferably lower alkyl or alkylene, and x is an integer of 1 to 6. Examples of the metal alkoxide compounds will be exemplified hereinafter.

Alkoxides of the metallic element of Group I are, for example, organosodium compounds, such as $NaOCH_3$, $NaOC_2H_5$ or $NaOC_3H_7$, or similar compounds wherein Li, K or the like is substituted for Na in the organosodium compounds.

Alkoxides of the metallic element of Group II are, for example, organomagnesium compounds, such as $Mg(OCH_3)_2$, $Mg(OC_2H_5)_2$, $Mg(OC_3H_7)_2$, $Mg(OC_4H_9)_2$, $Mg(OC_5H_{11})_2$ or $Mg(O_2C_2H_5)$ or similar compounds wherein Ca, Zn, Sr, Ba, Cd, etc., is substituted for Mg in the compounds.

Alkoxides of the metallic element of Group III are, for example, organoaluminium compounds, such as $Al(OC_2H_5)_3$, $Al(OC_3H_7)_3$ or $Al(OC_4H_9)_3$ or similar compounds wherein Ga, etc., is substituted for Al in the compounds.

Alkoxides of the metallic element of Group IV are, for example, organosilicone compounds, such as $Si(OCH_3)_4$, $Si(OC_2H_5)_4$, $Si(O\text{-iso-}C_3H_7)_4$, $Si(O\text{-n-}C_3H_7)_4$, $Si(O\text{-n-}C_4$, $Si(OC_5H_{11})_4$ or similar compounds wherein Ti, Zr, Ge, Sn, Hf, etc., is substituted for Si in the compounds.

The alkaline hydrolyzing agent may be any known compound capable of hydrolyzing the organometallic compound used. Examples of the alkaline hydrolyzing agent are hydroxides of alkali metals (i.e., sodium, potassium), and ammonia. In general, the hydrolyzing agent is used in the form of an aqueous solution. The kind of the hydrolyzing agent and the pH value may vary with the kind of the organometallic compound to be hydrolyzed. For example, a silicon alkoxide is conveniently hydrolyzed by an aqueous ammonia having a pH of 9.0 to 12.0.

In the process according to the present invention, it is convenient to feed each of the organometallic compound and the aqueous solution of the hydrolyzing agent in the form of a solution in an organic solvent. As such an organic solvent, it is possible to use any organic solvent which can dissolve the organometallic compound and the aqueous solution of the hydrolyzing agent. From the viewpoint of operability and availability, it is better to employ an alcohol such as methanol, ethanol, isopropanol, butanol, isoamyl alcohol, ethylene glycol, or propylene glycol.

As an organic solvent into which the organometallic compound and the aqueous hydrolyzing agent are fed, preferably in the form of the solution, any organic solvent which is inert to the reactants and products may be used. Preferably the same solvent is used as that for the above feed solution.

When practicing the process of the present invention, the organometallic compound is generally dissolved in the organic solvent to from a stock liquid A. On the other hand, the aqueous solution of the hydrolyzing agent is also dissolved in the organic solvent (which may be different from the above solvent, but is preferably the same) to form a separate stock liquid B. Further, the aqueous solution of the hydrolyzing agent is added to the separate organic solvent to form a reaction medium which is charged into a reaction vessel.

Then, the stock liquids A and B are introduced to the reaction vessel at given feeding rates. The stirring of the reaction solution is started before the introduction of the stock liquids and continued until the reaction is completed.

The feeding rate may be constant. In order to effectively control the particle size obtained, the feeding rate can be fast in a first stage wherein a grain seed is formed, and slow in a second stage wherein a powder material is grown from the seed. The particle size obtained can be controlled by reaction conditions. For example, the lower the temperature of the reaction vessel, the larger the particle size; the higher the polarity of the solvent, the smaller the particle size.

After the particle size of the powder material reaches the desired level, the product is separated from the solvent, dried, washed, and then dried again. The resulting powder material is generally amorphous. If desired, the amorphous powder material can be calcinated, for example, for several hours at several hundreds of degrees, to obtain a crystalline material.

Further, the resulting powder material can be utilized without separation from the reaction solvent. For example, after the growth of the grain seed is completed, a binder or the like can be added to the resulting mixture, and the whole as a liquid can be applied on a substrate and then calcinated.

Although the mechanism of the process of the present invention as mentioned above is not absolutely clear, the following assumption can be made: It is believed that the present process comprises two stages, i.e., the first stage of forming a grain seed and the second stage of growing a powder material therefrom. Referring to FIG. 1, a concentration of the metal hydroxide is increased as the organometallic compound is hydrolyzed. When the concentration of the hydroxide exceeds the critical level of supersaturation (C*), a nucleus is formed. As a result of the consumption of the solute, the concentration of the solute is lowered, and therefore, the formation of the grain seed ceases. Thereafter, the solute is consumed only for the growth of the grain seed until the concentration thereof reaches to the upper limit of solubility (Cs).

In order to produce the powder material having the uniform particle size, it is important to shorten a period of time when the concentration of the hydroxide exceeds the critical level of supersaturation. Further, in order to ensure a sufficient growth to the powder material, it is important to maintain the concentration of the hydroxide between the upper limit of solubility and the critical level of supersaturation.

The concentration can be controlled by introducing a large amount of the organometallic compound and the hydrolyzing agent until the neclei are formed, and then by carrying out a continuous supplement so that the concentration does not exceed the critical level of supersaturation.

The formation of the neclei can be easily observed by transmission electron spectroscope (TES) and scanning electron spectroscope (SES), etc.

The supersaturation state can be easily obtained by any known technique, for example, by varying the temperature of the reaction system.

The reactions in the process according to the present invention ca be schematically shown as follows:

Hydrolysis:

Condensation reaction:

-continued $$M(OH)_n \rightarrow MO\frac{n}{2} + \frac{n}{2} H_2O$$

In the above formulae, M is the metallic element, R is, for example, alkyl, and n is an integer of 1 to 4.

Typical reaction formulae are as follows:

$$Na(OCH_3) + H_2O \rightarrow Na(OH) + CH_3OH \quad (1)$$

$$2Na(OH) \rightarrow Na_2O + H_2O$$

$$Ca(O-isoC_3H_7)_2 + 2H_2O \rightarrow Ca(OH)_2 + 2isoC_3H_7OH \quad (2)$$

$$Ca(OH)_2 \rightarrow CaO + H_2O$$

$$Al(O-nC_4H_9)_2 + 3H_2O \rightarrow Al(OH)_3 + 3n-C_4H_9OH \quad (3)$$

$$2Al(OH)_3 \rightarrow Al_2O_3 + 3H_2O$$

$$Si(OC_2H_5)_4 + 4H_2O \rightarrow Si(OH)_4 + 4C_2H_5OH \quad (4)$$

$$Si(OH)_4 \rightarrow SiO_2 + 2H_2O$$

As explained above, the product formed in accordance with the present invention is the metal oxide which comprises the metallic element as defined above and has a substantially uniform particle size. The particle size can be controlled, ranging from about 0.1 μm to several microns. The product is generally obtained as a sphere.

The metal oxide obtained comprises predominantly amorphous material. However, a small amount of heat can bring about a crystalline product, and further, a complete amorphous product can be produced by an appropriate selection of the starting materials.

The process of the present invention brings the following advantages:

(1) By feeding the organometallic compound together with the hydrolyzing agent therefor, the particle can be grown to several microns, while realizing the narrow distribution of the particle size.

(2) Because the feeding rate of each of the organometallic compound and the hydrolyzing agent can be adjusted independently of the other, the condition of the reaction solvent in the reaction vessel can be easily controlled.

(3) Apart from the initial reaction conditions, the solvent, the hydrolyzing agent and the organometallic compound which are suitable for the particle growth can be introduced, and accordingly, the production time can be shortened.

(4) The organometallic compound can be given a high level of purity by fractionating, and therefore, a high level of purity of the resulting metal oxide can be easily obtained.

As described above, the characteristic features of the metal oxide prepared in accordance with the present invention reside in the spherical shape and the uniform particle size. Therefore, the metal oxide prepared by the present process has a superior calcination property over the convention powder metal oxide, and accordingly, the metal oxide prepared by the present process will greatly contribute to an improvement of the properties of fillers of synthetic resins, electronic materials, spacer materials, dental materials, engineering materials, or the like.

EXAMPLES

The present invention now will be further illustrated by, but is by no means limited to, the following Examples.

In the following Examples, analyses of the properties were carried out as follows, unless otherwise indicated:

Evaluation of Properties

Evaluation of the properties was mainly carried out on the basis of observation by electron micrographies, as well as measurement by a centrifugal particle size analyzer. More particularly, a shape, a particle size and a microstructure were observed by a transmission electron microscope, JEM-T20 (Nippon Denshi K.K.), and a particle size distribution was measured by a centrifugal particle size analyzer, SA-CP3 (Shimadzu Corporation).

EXAMPLE 1

This example was obtained for comparison purposes, and does not illustrate the embodiment of the present invention.

(1) Batchwise Process

In this example (1—1), commercially available reagents were used; i.e., ethanol (99.5%; guaranteed grade), aqueous ammonia (>28%; guaranteed grade), and ethyl silicate (>96%).

A reaction medium was prepared by diluting 0.1 mole of water and 0.35 mole of aqueous ammonia with ethanol to 100 ml. The reaction medium was maintained at 20° C.±0.5° C. and agitated with a magnetic stirrer.

Figure 3:
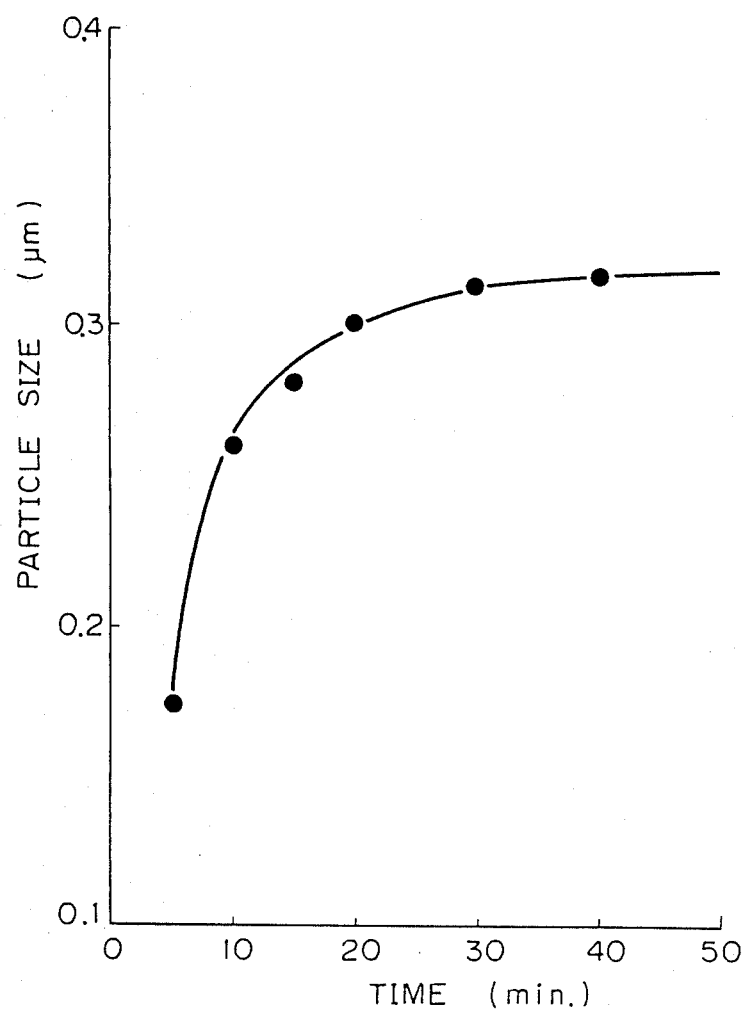
FIG. 3 is a graph illustrating a powder growth in a conventional process.

After the temperature reached the above pre-determined point, 0.035 mole of ethyl silicate was added, and after this addition, the relationship between the particle size and the elapsed time was observed. The result is shown in FIG. 3. It is apparent that the particle size reached almost the upper limit around 20 minutes after the addition.

(2) Process without Alkali

Figure 2:
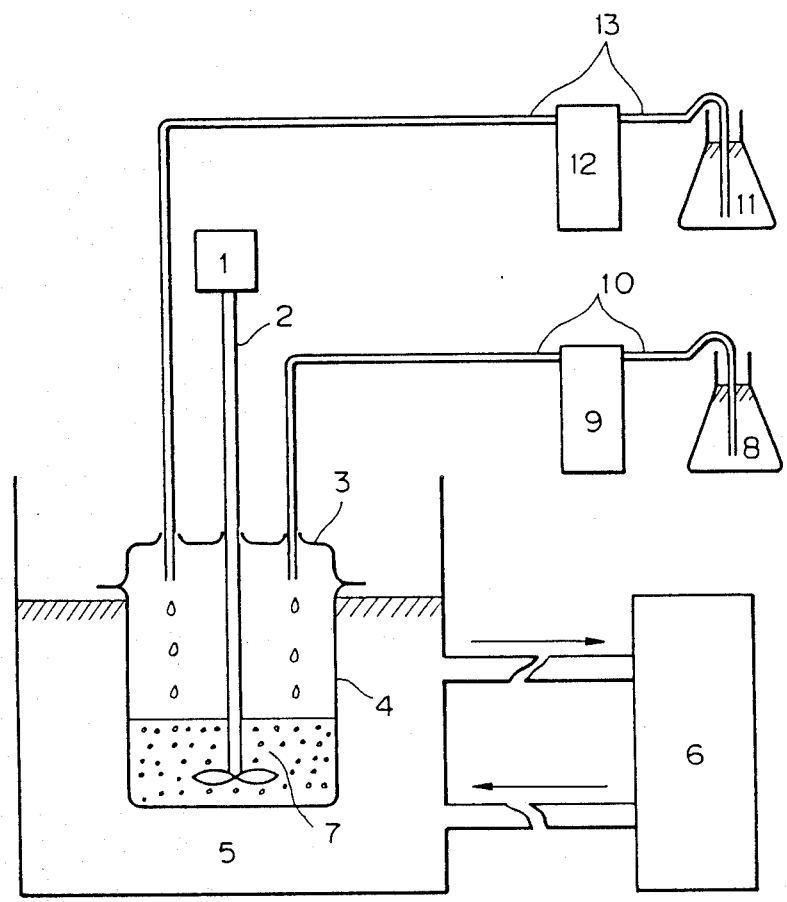
FIG. 2 shows an apparatus for carrying out the present process.

The reagents used in the above batchwise process (1) were also employed in this example (1-2). Further, the apparatus as shown in FIG. 2 was used.

A solution (50 ml) of ammonia (6.8 mole/l) and water (32 mole/l) in ethanol was prepared and charged as a reaction medium 7 into a separable flask 4 provided with a separable cover 3 and a rotating blade 2 connected to a stirring motor 1. The reaction medium 7 was maintained at 10° C.±0.2° C. by circulating water 5 through a temperature controller 6.

A solution of ethyl silicate (0.4 mole/l) in ethanol was prepared and charged into a vessel 8. An amount of 50 ml of the solution was introduced into the separable flask 7, via a tube 10 by a pump 9, while maintaining the temperature at 10° C.±0.2° C. The reaction mixture was then stirred for 1 hour to form nuclei.

Figure 4:
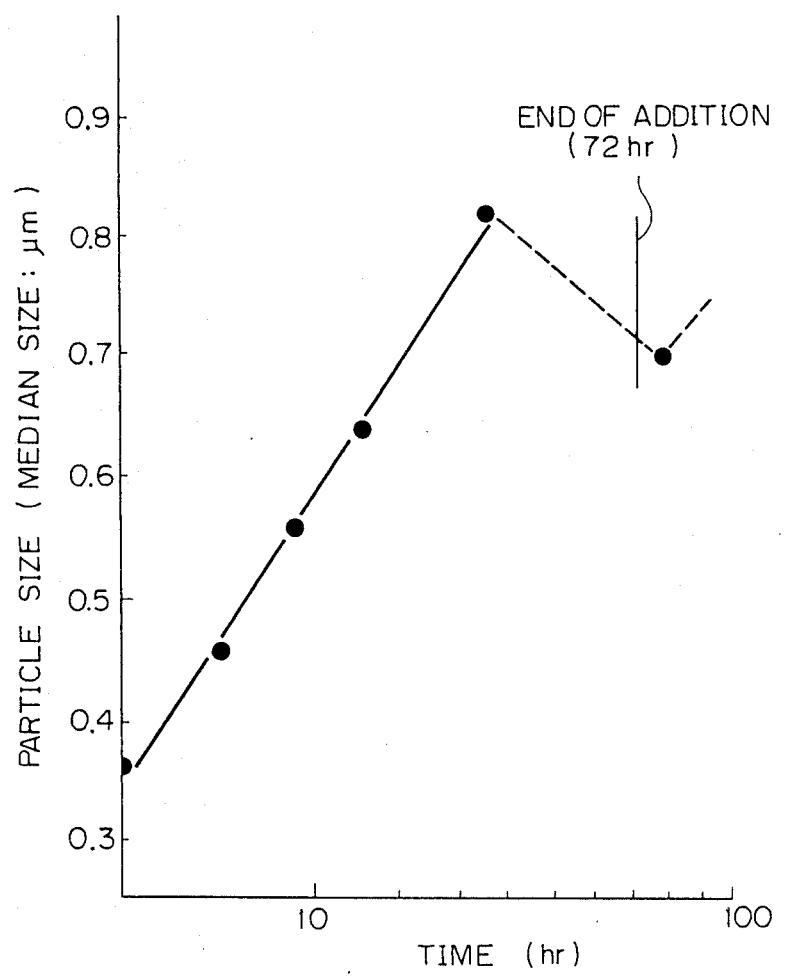
FIG. 4 is a graph illustrating a powder growth in another conventional process.

Further, ethanol was charged in a vessel 11, and 450 ml of ethanol was then introduced into the separable flask 7 via a tube 13 by a pump 12, at a rate of 0.1 ml/min. At the same time, 450 ml of the ethanol solution of ethyl silicate was introduced from the vessel 8 to the flask 7 at the same feeding rate, to grow the neclei. The particle size was measured as time elapsed, and the maximum size (0.82 μm) was observed 36 hours later. Thereafter, the particle size was reduced. The size at 72 hours was 0.70 μm. Thereafter, the reaction mixture became a paste and the spherical powder materials disappeared. The result is shown in FIG. 4.

EXAMPLE 2

This example illustrates one embodiment of the present invention.

Figure 6:
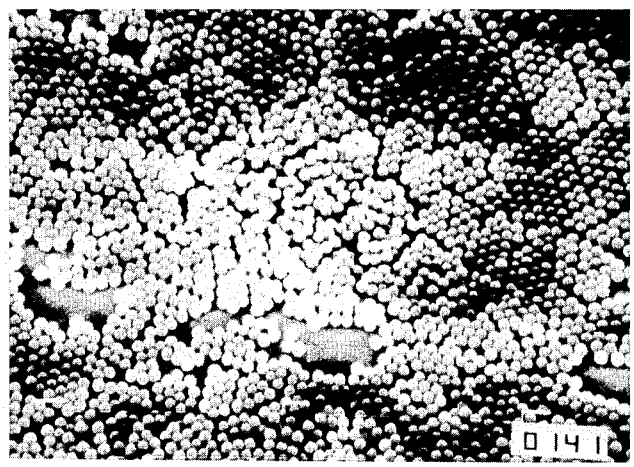
FIG. 6 is an electron micrography of a powder material before a growth step, prepared according to the present process.

In this example, the apparatus as shown in FIG. 2 also was used. In order to form a necleus, a solution $A_1$ of ethyl silicate (0.2 mole/l) in ethanol was prepared and charged in a storage vessel (not shown). Further, a solution $B_1$ of ammonia (3.4 mole/l) and distilled water (16 mole/l) in ethanol was prepared and charged in a separate storage vessel (not shown). To the separable flask 7, 50 ml of the solution $A_1$ was introduced and maintained at 10° C. with stirring. Thereafter, 50 ml of the solution $B_1$ was rapidly added thereto to form the nuclei. The neclei formed 100 minutes after said addition were observed by the transmission electron microscope ($\times 5{,}000$). The electron micrograph thereof is shown in FIG. 6. The particle size of the nucleus was about 0.4 μm.

Figure 5:
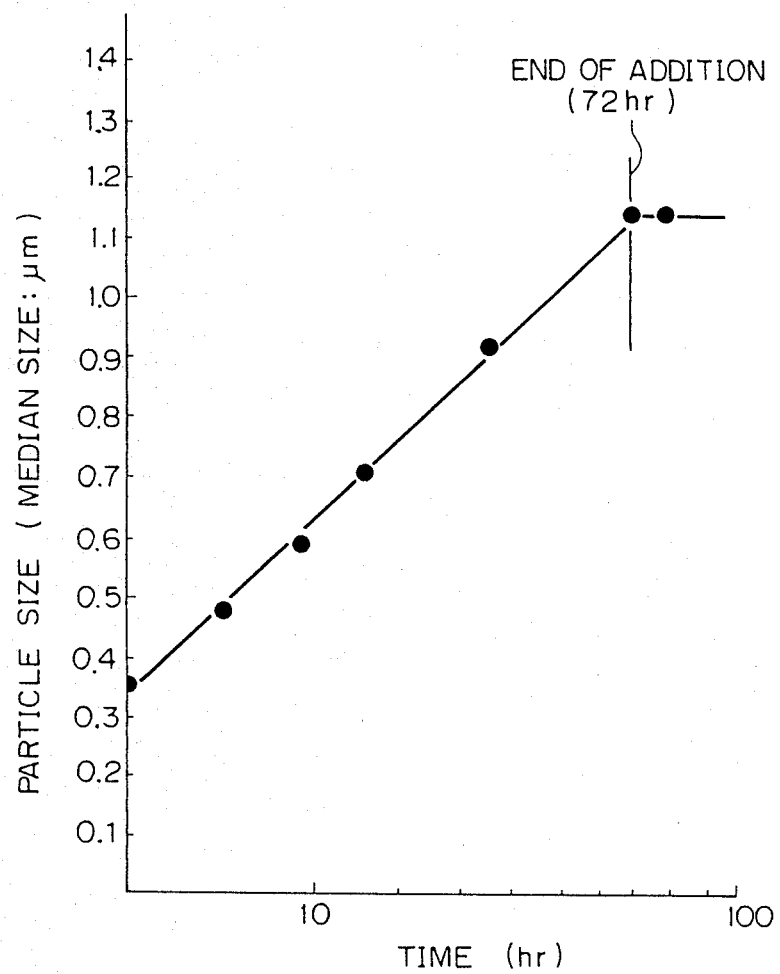
FIG. 5 is a graph illustrating a powder growth in the process according to the present invention.
Figure 7:
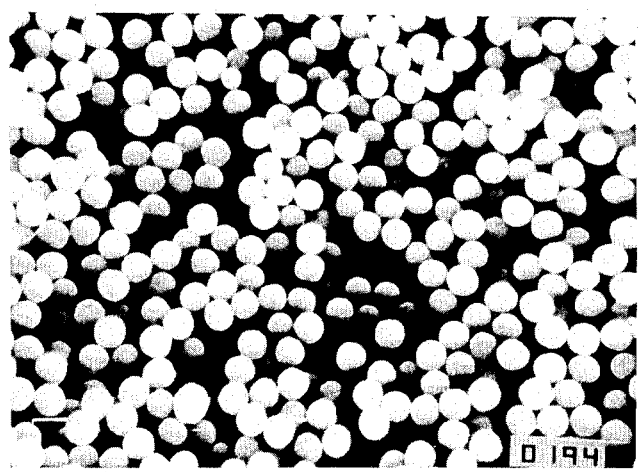
FIG. 7 is an electron micrography of a powder material after a growth step, prepared according to the present process.

A solution $A_2$ of ethyl silicate (0.4 mole/l) in ethanol, and a solution $B_2$ of ammonia (3.4 mole/l) and distilled water (8 mole/l) in ethanol were prepared and charged in the vessels 8 and 11, respectively. The solutions $A_2$ and $B_2$ were introduced at the rate of 0.75 mole/min into the flask 7 containing the neclei. The growth of the seeds was observed and the result is shown in FIG. 5. After the addition was completed (72 hours), the electron micrograph ($\times 5{,}000$) of the powder material formed was taken. The result is shown in FIG. 7. The particle size was about 1.5 μm.

Figure 8:
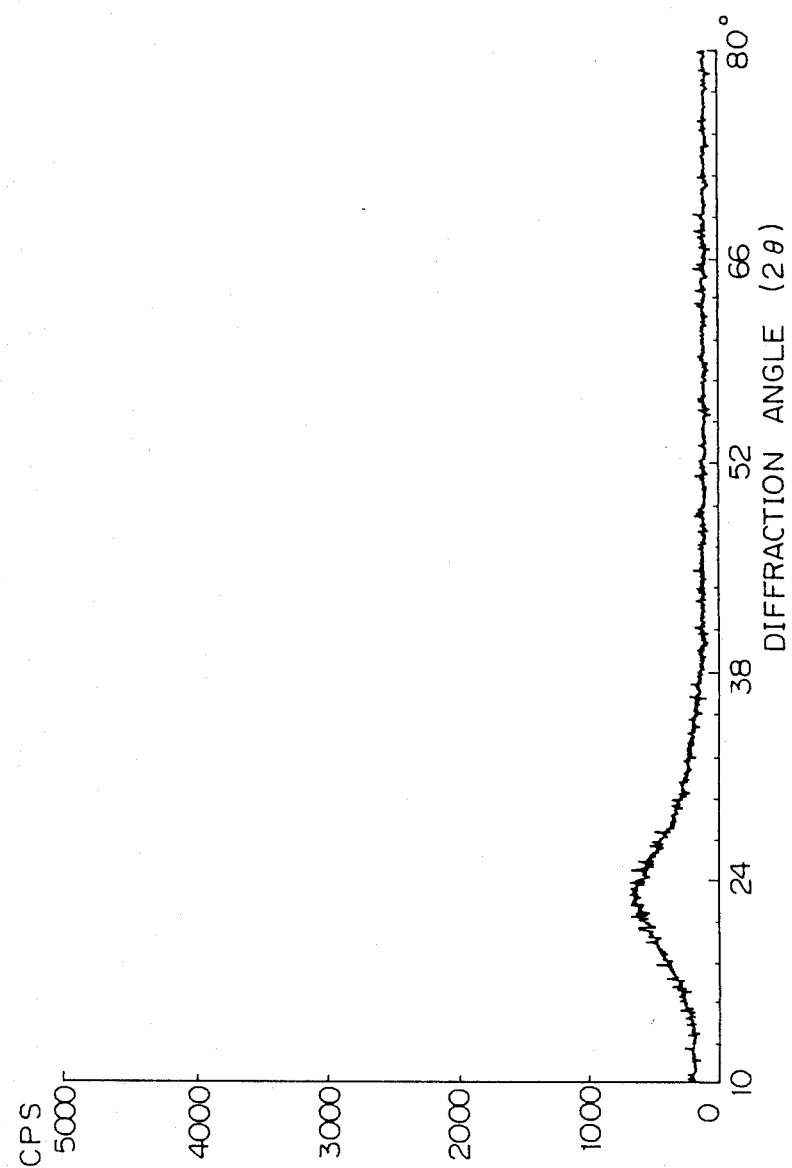
FIG. 8 is an X-ray diffraction pattern of a powder material prepared according to the present process.
Figure 9:
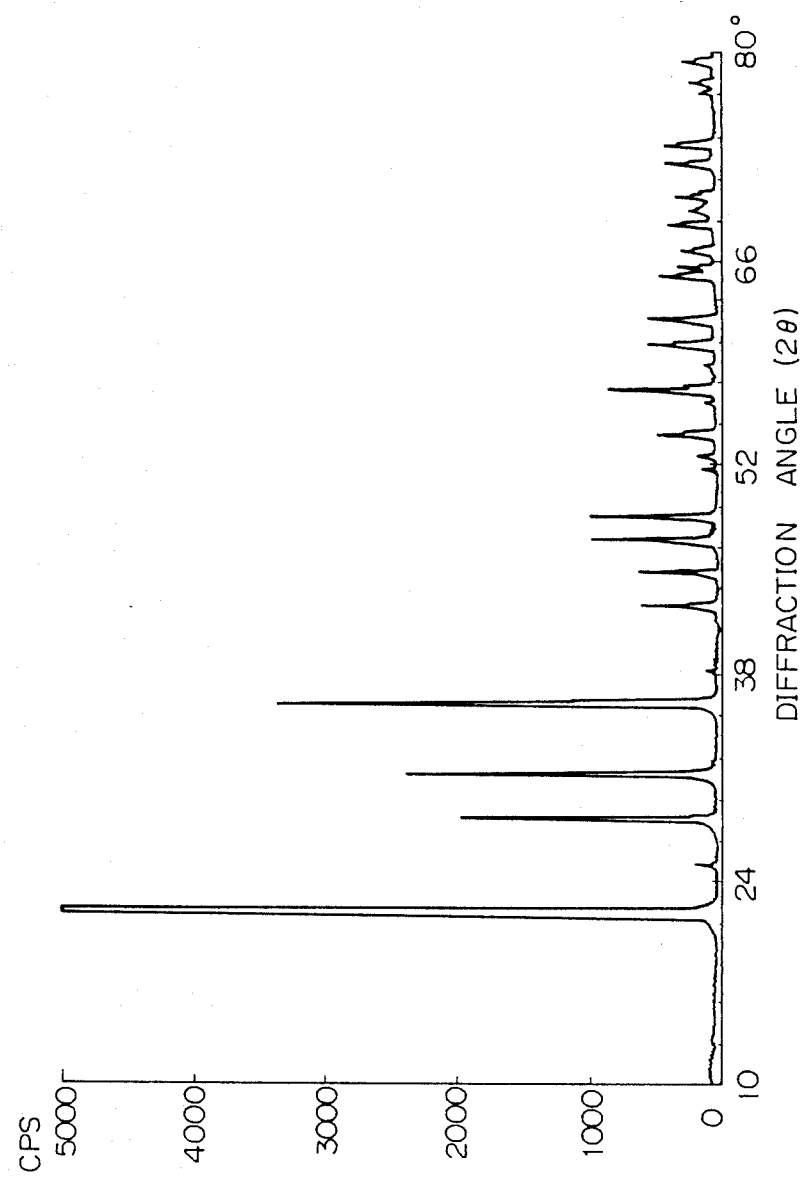
FIG. 9 is an X-ray diffraction pattern of a powder material after calcination of the material of FIG. 8.

The powder material was dried and analyzed by an X-ray diffraction to determine the crystalline structure. The pattern is shown in FIG. 8, from which it is apparent that the powder material was amorphous. The powder material was calcinated for 1 hour at 1,500° C. and analyzed by an X-ray diffraction. The result is shown in FIG. 9, which indicates a cristobalite crystalline phase.

EXAMPLE 3

As in Example 2, various metal oxides were produced using various metal alkoxides and organic solvents listed in the following Table 1 and the particle sizes thereof were measured.

TABLE 1

| Organic solvent | Metal alkoxide | Concentration at seed formation stage (mol/l) | Concentration at growth stage (mol/l) | Metallic oxide | Particle size (μm) |
|---|---|---|---|---|---|
| Isopropanol | $NaOCH_3$ | 1.0 | 2.0 | $Na_2O$ | 1.5 |
| Isopropanol | $Ca(Oiso-C_3H_7)_2$ | 0.2 | 0.4 | $CaO$ | 1.3 |
| Ethanol | $Al(O-nC_4H_9)_3$ | 0.15 | 0.2 | $Al_2O_3$ | 1.2 |
| Ethanol | $Ga(O-nC_4H_9)_4$ | 0.2 | 0.4 | $GaO_2$ | 1.1 |
| Butanol | $Ti(O-nC_4H_9)_4$ | 0.1 | 0.1 | $TiO_2$ | 2.0 |

Although the present invention has been described with reference to specific embodiments, various changes and modifications obvious to those skilled in the art are deemed to be within the spirit, scope and concept of the invention.

We claim:

1. A process for the manufacture of a metal oxide wherein a hydrolyzable organometallic compound is hydrolyzed by an alkaline hydrolyzing agent in an organic solvent, and thereafter, the metal oxide is formed by a condensation reaction of a metal hydroxide resulting from the hydrolysis of the organometallic compound, characterized in that the organometallic compound and the hydrolyzing agent are fed into the organic solvent so that a concentration of the hydrolyzed compound is initially above a critical level of supersaturation, and thereafter, is maintained in a range from above an upper limit of solubility to the critical level of supersaturation.

2. A process according to claim 1, wherein the organometallic compound has a structure such that a metallic element present in said compound is bonded to an organic moiety therein via an oxygen atom.

3. A process according to claim 2, wherein the metallic element is selected from a group consisting of the elements belonging to Groups I to IV of the Periodic Table.

4. A process according to claim 3, wherein the metallic element is selected from a group consisting of lithium (Li), sodium (Na), magnesium (Mg), aluminium (Al), silicon (Si), potassium (K), calcium (Ca), scandium (Sc), titanium, (Ti), copper (Cu), zinc (Zn), gallium (Ga), germanium (Ge), rubidium (Rb), strontium (Sr), yttrium (Y), zirconium (Zr), indium (In), tin (Sn), cesium (Cs), barium (Ba), lanthanoid (Ln), hafnium (Hf), mercury (Hg), thallium (Tl), and lead (Pb).

5. A process according to claim 2, wherein the organometallic compound is a metal alkoxide.

6. A process according to claim 1, wherein the hydrolyzing agent is fed in the form of a solution comprising an organic solvent, water and the hydrolyzing agent.

7. A process according to claim 1, wherein the hydrolyzing agent is an ammonia or a hydroxide of an alkali metal.

8. A process according to claim 1, wherein the organic solvent into which the organometallic compound and the hydrolyzing agent are fed is alkaline.

9. A process according to claim 1, wherein the metal oxide is formed in the form of a powder material with a uniform particle size distribution.

10. A process according to claim 8, wherein the powder material of the metal oxide has an average particle size of 0.1 μm to 10 μm.

* * * * *